United States Patent [19]

Heightley

[11] 3,885,169

[45] May 20, 1975

[54] STORAGE-PROCESSOR ELEMENT INCLUDING A BISTABLE CIRCUIT AND A STEERING CIRCUIT

[75] Inventor: John Donnell Heightley, Basking Ridge, N.J.

[73] Assignee: Bell Telephone Laboratories, Incorporated, Murray Hill, N.J.

[22] Filed: Nov. 15, 1972

[21] Appl. No.: 306,804

Related U.S. Application Data

[62] Division of Ser. No. 120,834, March 4, 1971, Pat. No. 3,720,821.

[52] U.S. Cl. ................ 307/246; 307/238; 307/291; 307/292

[51] Int. Cl. ......................... H03k 17/00; H03k 3/12

[58] Field of Search ........... 307/238, 246, 289, 291, 307/292, 279, 221 R, 221 B, 221 C; 328/206

[56] References Cited

UNITED STATES PATENTS

| | | | |
|---|---|---|---|
| 2,888,579 | 5/1959 | Wanlass | 307/208 |
| 2,965,767 | 12/1960 | Wanlass | 307/221 R |
| 3,067,336 | 12/1962 | Eachus | 307/221 R |
| 3,363,115 | 1/1968 | Stephenson et al. | 307/279 |
| 3,421,026 | 1/1969 | Stopper | 307/289 |
| 3,518,635 | 6/1970 | Cole et al. | 307/238 X |
| 3,573,754 | 4/1971 | Merryman | 307/238 X |
| 3,588,844 | 6/1971 | Christensen | 307/238 X |
| 3,611,318 | 10/1971 | Heightley et al. | 307/238 X |
| 3,614,469 | 10/1971 | Heightley | 307/292 X |
| 3,643,230 | 2/1972 | Lynes | 307/221 R |

*Primary Examiner*—Stanley D. Miller, Jr.
*Attorney, Agent, or Firm*—Richard B. Havill

[57] ABSTRACT

Disclosed is a storage-processor element, designed so that groups of such elements can be interconnected into threshold logic circuits. Each element is arranged to decide which one of a pair of double-rail input signals has a higher potential and to store the result of that decision. Information read out of storage directs a unit of current to one or the other of two output busses.

A threshold logic adder circuit and a threshold logic two's-complement circuit use combinations of the storage-processor elements.

10 Claims, 10 Drawing Figures

STORAGE-PROCESSOR ELEMENT INCLUDING A BISTABLE CIRCUIT AND A STEERING CIRCUIT

This is a division of application Ser. No. 120,834, now U.S. Pat. No. 3,720,821, filed Mar. 4, 1971.

BACKGROUND OF THE INVENTION

1. Field of the Invention

The invention is a semiconductor storage-processor element that is more particularly described as a building block for threshold logic circuits.

2. Description of the Prior Art

In the prior art, some threshold logic circuits are simpler and less expensive to construct than Boolean logic circuits which produce the same output logic. A full adder is one such threshold logic circuit which has a simpler configuration than an equivalent Boolean logic circuit.

In prior art serial multiplier circuits, several full adder stages are connected in a tandem sequence for accumulating a sum which is a portion of a product sought. A fast cycle time for generating the cumulative sum is achieved by temporarily storing the sum produced at each full adder before applying such sum to the input of the next subsequent full adder. Such serial multiplier circuits have been implemented by Boolean logic full adders having flip-flop circuits interposed therebetween.

In view of the fact that some threshold logic adder configurations are simpler than equivalent Boolean logic adder configurations and that fast serial multipliers have delay units interposed between adder stages, there exists a need for a circuit element which stores data and which can be arranged to process that data by threshold logic techniques.

Known threshold logic gates having a group of current steering circuits appear to be advantageous except that such gates lack the delay elements which are interposed between full adders of the serial multiplier. Thus it is possible to process the data by threshold logic, but there is no provision for storage of the data.

Therefore, it is an object of the invention to develop a threshold logic building block that both stores and processes data bits.

SUMMARY OF THE INVENTION

This and other objects of the invention are realized in an illustrative embodiment thereof in which a storage-processor element includes a pair of emitter-followers and diodes for coupling input signals to a flip-flop that decides which of two input signals has a higher potential and stores the result of the decision. A pair of charge storage devices stores quantities of charge representing information being read out of the flip-flop as a unit of current. A steering circuit converts the stored charge into a unit of current that is directed to one or the other of two output busses while new information is being stored in the flip-flop. Information is stepped through the element in response to two control signals. The element is arranged so that groups of such elements are readily connectable into threshold logic circuits.

A feature of the invention is a combination including emitter-followers and diodes coupling input signals to a flip-flop, devices storing charge representing information being read out of the flip-flop, a current steering circuit that converts the stored charge into a unit of current while new information is being stored in the flip-flop, and a circuit applying control signals to the combination.

Another feature of the invention is an arrangement of storage-processor elements as a threshold logic adder.

A further feature of the invention is an arrangement of storage-processor elements as a threshold logic two's-complement circuit.

BRIEF DESCRIPTION OF THE DRAWINGS

A better understanding of the invention may be derived from the detailed description following, if that description is considered with respect to the attached drawings in which.

DETAILED DESCRIPTION

Figure 1:
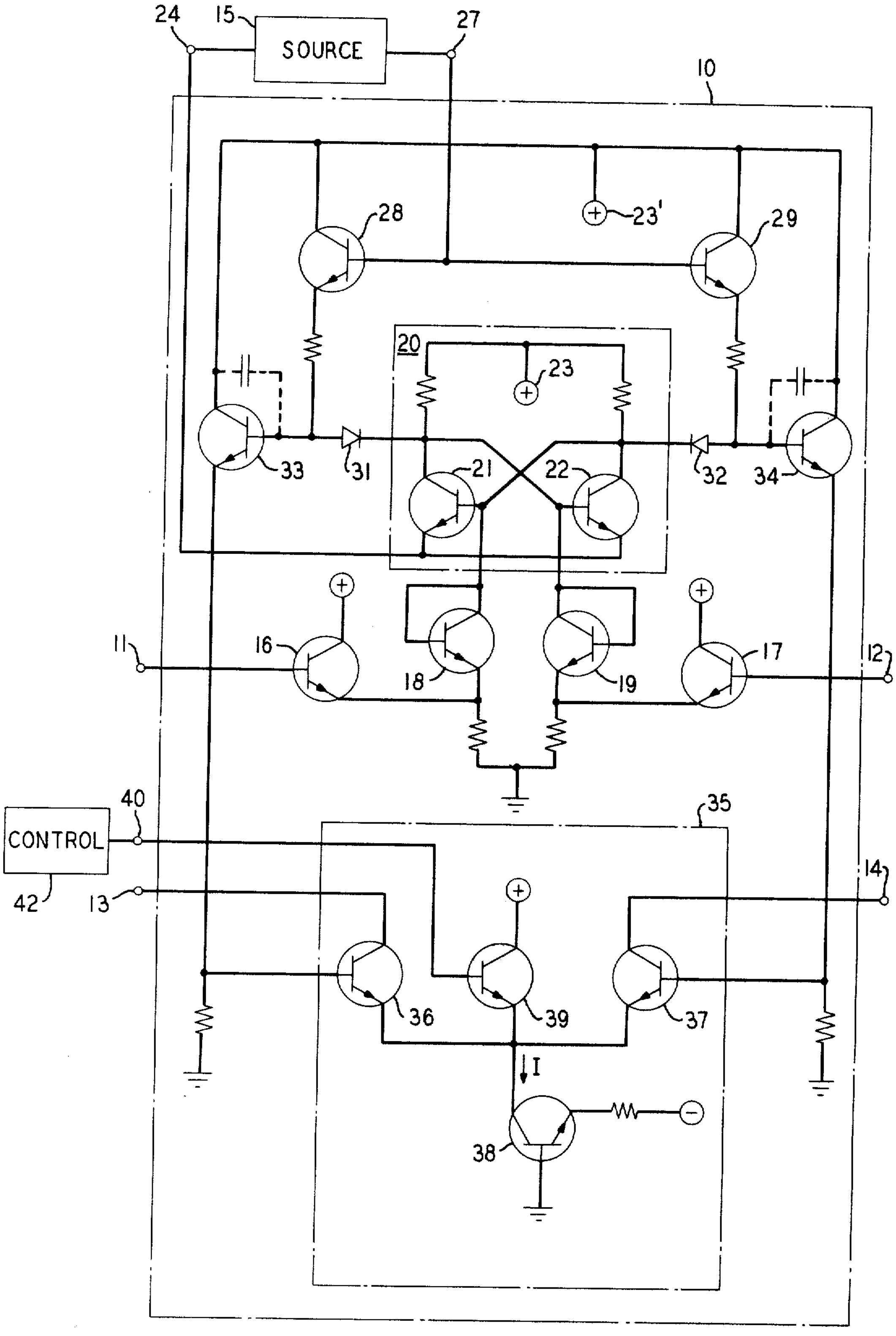
FIG. 1 shows a schematic diagram of a storage-processor element, arranged in accordance with the invention.

Referring now to FIG. 1, there is shown a schematic diagram of a storage-processor element 10 that is a building block for threshold logic circuits. The element 10 is a circuit that receives double-rail input data by way of terminals 11 and 12. While data is stored within the element 10, a unit of output current, representative of the stored data, is steered alternatively to one or the other of a pair of output terminals 13 and 14.

In FIG. 1 the input terminals 11 and 12 are coupled through a pair of emitter-follower connected transistors 16 and 17 and a pair of diode-connected transistors 18 and 19 to the inputs of a flip-flop circuit 20. This flip-flop circuit 20 includes a pair of transistors 21 and 22 cross-coupled conventionally so that the transistors 21 and 22 conduct alternatively.

A source 23, represented by a symbolic circle enclosing a plus sign, supplies operating bias to the flip-flop circuit 20. The symbol indicates that a positive terminal of a constant potential supply is connected into the circuit at the point shown and that the negative terminal of the same supply is grounded. This symbol is used throughout FIG. 1 to represent connections between the circuit of FIG. 1 and the same supply.

Another source of bias 15 is applied to the storage-processor element 10 by way of a terminal 24. This is a periodic bias control signal 25, shown in FIG. 2, and is used for controlling the operation of the flip-flop 20 of FIG. 1.

Figure 2:
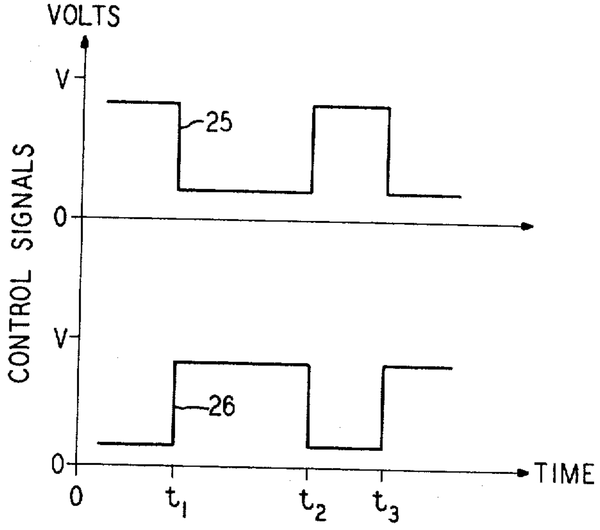
FIG. 2 is a timing diagram of control signals applied to the storage-processor element of FIG. 1 for driving the element through a cycle of operation.

The flip-flop operates in a standby condition while the signal 25 of FIG. 2 is at the low positive potential shown from time $t_1$ through time $t_2$. This potential is sufficiently low so that one of the transistors 21 and 22 conducts depending upon what information is stored in the flip-flop.

Recalling that input signals applied to the storage-processor element 10 are double-rail data signals, it is noted that during standby operation the input signals have potentials which are more positive than the potential of the signal 25 between the times $t_1$ and $t_2$, as shown in FIG. 2. The input signals, however, are coupled through the emitter-followers 16 and 17 to the emitters of the transistors 18 and 19 which are cut off because forward bias thereacross is insufficient to conduct significant current through the transistors 18 and 19. While the transistors 18 and 19 are cut off, the state of conduction of the flip-flop 20 is unaffected by the data signals applied to the input terminals 11 and 12.

Also during standby operation, there is a second bias control signal 26, shown in FIG. 2, applied from the source 15 of FIG. 1 to the storage-processor element 10 by way of a terminal 27 and base electrodes of transistors 28 and 29. The potential level of the bias control signal 26, as shown between the times $t_1$ and $t_2$ of FIG. 2, is a positive potential having a magnitude nearly as high as the potential V of the source 23. Transistors 28 and 29 are biased to conduct current from supply terminal 23' through the transistors 28 and 29 and diodes 31 and 32 to collector electrodes of the transistors 21 and 22.

Since the diodes 31 and 32 are conducting during standby, the potential levels at the collector electrodes of the transistors 21 and 22 are coupled respectively through the diodes 31 and 32 to the base electrodes of transistors 33 and 34. The transistors 33 and 34 are each connected in emitter-follower circuit arrangements.

Parasitic base-collector capacitances of the transistors 33 and 34 are shown illustratively by capacitors connected into FIG. 1 by dotted leads. These parasitic capacitances store quantities of charge proportional to the potential levels coupled through the diodes 31 and 32 from the collector electrodes of the transistors 21 and 22 while the flip-flop 20 operates in standby.

The emitter-follower transistors 33 and 34 couple potentials from their base electrodes to their emitter electrodes and to a current steering circuit 35.

In the current steering circuit 35, the potentials on the emitters of transistors 33 and 34 are applied directly to base electrodes of transistors 36 and 37. An emitter circuit transistor 38 regulates emitter-circuit available to the transistors 36 and 37. A control transistor 39 enables and disables the steering circuit 35 in response to control signals that are applied by way of a control terminal 40.

When the control signal applied by a control source 42 to the terminal 40 is at ground potential, the current steering circuit is enabled. As long as the steering circuit 35 is enabled, substantially all of the available emitter current supplied through transistor 38 is steered through one of the transistors 36 or 37. The one of the transistors 36 and 37 having a sufficiently higher positive potential applied to its base electrode conducts substantially all of the current from transistor 38.

This current, conducted through the transistor 38 and alternatively the transistor 36 or the transistor 37, has a predetermined magnitude and is the outer signal of the storage-processor element. This output current is considered to be a unit of current.

A positive potential control signal, applied by the control source 42 to the control terminal 40, has sufficient potential to enable the transistor 39 to conduct all of the current carried by the emitter circuit transistor 38. As a result, the transistors 36 and 37 of the steering circuit 35 are disabled.

In summary it can be said that during standby operation the storage-processor element 10 is isolated from input signals because the first bias control signal 25 applied to terminal 24 cuts off the transistors 18 and 19. At the same time, the flip-flop 20 retains stored information, and the second bias control signal 26 enables the state of the flip-flop 20 to be coupled to the steering circuit 35 for determining which of the transistors 36 or 37 is enabled to conduct a unit of output current to its associated output terminal 13 or 14.

To change information stored in the element 10, the bias control signal 25 and 26 applied to the terminals 24 and 27 are transposed so that a potential near the supply potential V is applied to terminal 24 and a low positive potential is applied to the terminal 27. These new potential levels are shown in FIG. 2 from $t_2$ until time $t_3$. The high positive potential on the terminal 24 is high enough to cut off the transistors 21 and 22. As a result, the diode-connected transistors 18 and 19 are biased into conduction between the supply 23 and ground. Recalling once again that input signals are double-rail data signals, it is noted that a high potential is coupled to one input of the flip-flop 20 and a low potential is coupled to the other input. The positive potential on the terminal 24 permits the bases of the transistors 21 and 22 to rise until the diodes 18 and 19 clamp the potentials of the bases of the transistors 21 and 22 at potentials corresponding with the input signals then being applied.

Since the input terminals 11 and 12 of the storage-processor element 10 usually are connected to the output terminals of other storage-processor elements also controlled by the bias control signals 25 and 26, information signals that are applied to the input terminals 11 and 12 are limited in duration after the bias control signal transients at the time $t_2$. The duration is limited to an interval during which charge is retained on the parasitic base capacitances of transistors similar to the transistors 33 and 34. Thus, the interval between the times $t_2$ and $t_3$ in FIG. 2 is limited to a time that is equal to the time required to discharge the parasitic capacitances of the transistors 33 and 34.

The two different potentials on the bases of the transistors 21 and 22 will set the flip-flop 20 in one or the other of its two stable states when the bias control signals 25 and 26 change again at the time $t_3$, as shown in FIG. 2. Since the input signals fix the state of the flip-flop, the flip-flop 20 decides which one of the input signals is at a higher potential.

Because the low potential is applied to terminal 27 between the times $t_2$ and $t_3$, the transistors 28 and 29 and the diodes 31 and 32 are cut off. As a result, the collector electrodes of transistors 21 and 22 are decoupled from the base electrodes of transistors 33 and 34. Only the charge stored on the parasitic capacitors at the bases of transistors 33 and 34 temporarily holds the transistors 33 and 34 in their respective states of conduction from the time $t_2$ until the time $t_3$. Thus, the output of the element 10 remains constant until the time $t_3$ when new information is stored in the flip-flop 20.

Figure 3:
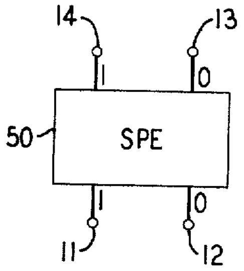
FIGS. 3 and 3A show symbolic blocks representing the storage-processor element of FIG. 1.

Referring now to FIG. 3, there is shown a symbolic storage-processor element 50 representing the storage-processor element 10 of FIG. 1. This symbolic element 50 is used in block diagrams of threshold logic circuit arrangements to be described hereinafter.

Although the bias control signal input terminals 24 and 27, shown in FIG. 1, are omitted from the symbol of FIG. 3, it is to be understood that bias control signals are applied to the block 50 as they are applied to the element 10 of FIG. 1. Thus, any threshold logic circuit using the storage-processor element 50 has bias signal source 15 for applying a pair of bias signals concurrently to each element 50.

Control terminal 40 also is omitted from the block 50 indicating that the terminal 40 is not required for operating the storage-processor element represented by the block 50.

All other input and output terminals of the element 10 in FIG. 1 are shown on the block 50 of FIG. 3. Thus the double-rail input terminals 11 and 12 are shown at the bottom of the block 50, and double-rail output terminals 13 and 14 are shown at the top of the block 50. It is noted that the output terminals 13 and 14 are reversed from left to right. This reversal is employed so that a convenient notation convention can be established.

In this convention a 1 is considered to be stored in the element 50 when the potential applied to the terminal 11 is higher than the potential applied to the terminal 12. Thereafter when a 1 is stored in the element 50, a unit of current is pulled into the terminal 14. In this convention, the input and output 1 terminals are to the left and the 0 terminals are to the right.

Figure 3A:
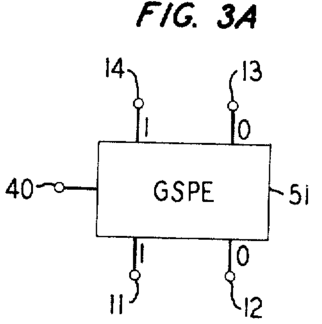

Referring now to FIG. 3A, there is shown another symbolic storage-processor element 51, which is just like the element 50 except that the element 51 includes the control terminal 40 because gate control signals are used in the operation of the element 51. The steering circuit control terminal 40, shown in FIG. 3A, is the same as the terminal 40 of FIG. 1 and therefore receives signals for enabling and disabling the output of the element 10.

Figure 4:
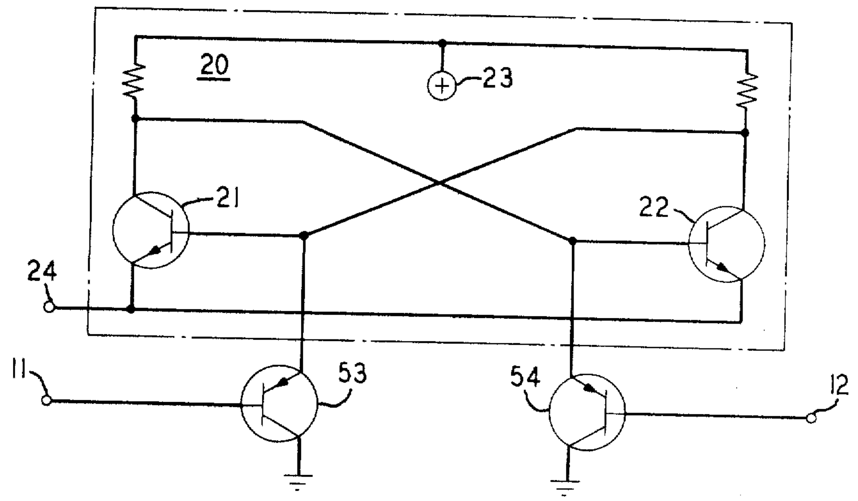
FIG. 4 shows an alternative input arrangement for the storage-processor element of FIG. 1.

Referring now to FIG. 4, there is shown an alternative arrangement for coupling input signals into the element 10 of FIG. 1. In FIG. 4, designators corresponding to designators of FIG. 1 are used to designate devices that are alike in both figures.

Thus in FIG. 4 a pair of PNP transistors 53 and 54 couple input signals from the terminals 11 and 12 respectively to the base electrodes of the transistors 21 and 22 in the flip-flop 20. The transistors 53 and 54 are arranged so that input signals are applied to their base electrodes. Their collectors are connected to ground, and their emitters are connected respectively to the base electrodes of the transistors 21 and 22. Bias control signal 25, applied by way of the input terminal 24, enables and disables the transistors 53 and 54. When the transistors 53 and 54 are enabled, input signals are coupled through the transistors 53 and 54 to their emitter electrodes, as in well-known emitter-follower circuits. Thus input signals are coupled to the flip-flop circuit 20.

As previously mentioned, the storage-processor element 10 of FIG. 1 can be interconnected in groups forming threshold logic circuits. Examples of such threshold logic circuits are shown in FIGS. 5 through 9 to be described.

The threshold logic circuits of FIGS. 5 through 9 produce output signals which are manifested by current conducted through one or the other of two output terminals. A logical decision that determines which of the two outputs is to conduct is made by comparing an analog sum of weighted inputs with a reference, or threshold, level. Each threshold logic circuit produces a current through a first output terminal when the sum of weighted inputs is equal to or greater than the threshold level and produces a current through a second output terminal when the sum of weighted inputs is less than the threshold level.

ADDER CIRCUIT

Figure 5:
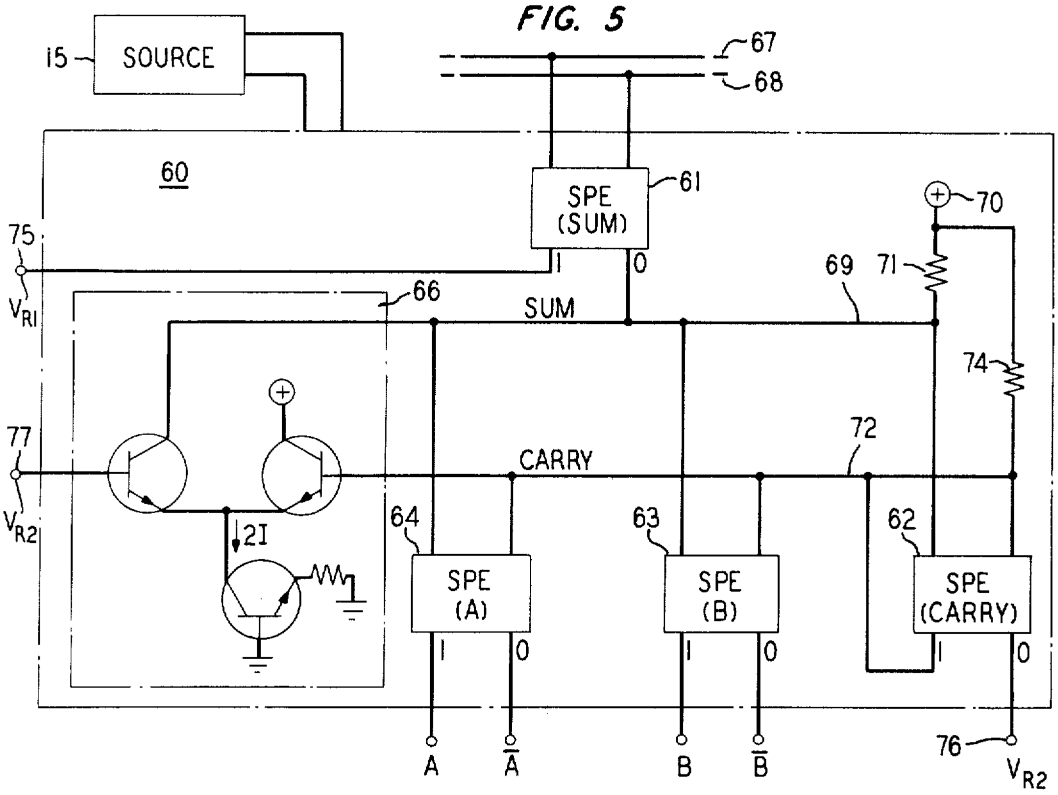
FIG. 5 shows a block diagram of a threshold logic adder circuit including a group of storage-processor elements.

Referring now to FIG. 5, there is shown a block diagram comprising storage-processor elements arranged as a threshold logic two-bit full serial adder circuit 60. There are four storage-processor elements 61, 62, 63, and 64 and a current steering circuit 66 included in the adder circuit 60.

Element 61 is arranged to receive and store a sum bit that results from adding two input bits stored in the elements 63 and 64 and a carry bit stored in the element 62. The magnitude of the sum bit to be stored in element 61, whether a 1 or a 0, is determined by comparing a variable potential applied to the 0 input of the element 61 with a fixed threshold voltage applied to the 1 input of that element. While the element 61 is storing a bit, the magnitude is indicated by a unit of current conducted to busses 67 and 68, respectively, depending upon whether a 1 or a 0 is stored.

Units of current steered to a sum bus 69 determine the potential on the 0 input of the element 61. These units of current are conducted from a power supply 70 through a resistor 71 and the sum bus 69 to the 1 outputs of the storage-processor elements 62, 63, and 64 and to the steering circuit 66. The number of units of current depends upon whether or not the elements 62, 63, and 64 store a 1 and whether or not a carry is generated in the summation.

The adder 60 operates in response to bias control signals applied concurrently from the source 15 to all storage-processor elements. These bias control signals are the same as the bias signals shown in FIG. 2. Leads from the source 15 are terminated at block 60 rather than being extended to all of the storage-processor elements to simplify the diagram so that the threshold logic circuit presented therein is clear.

Briefly, the adder circuit functions in the following sequence. Initially, sum element 61 and the carry element 62 are clear, and first and second bits representing new digits to be summed are stored respectively in the input elements 63 and 64. The stored information is coupled to the outputs of the elements 63 and 64 by means of current conducted alternatively through one or the other of the output terminals of each element. These units of current establish a potential level on each of the sum bus 69 and a carry bus 72 while the information is stored.

When the bias control signals of FIG. 2 change at the time $t_2$, potentials, representing sum and carry information respectively on the busses 69 and 72, are coupled to the inputs of the flip-flops in the elements 61 and 62. Commencing at the time $t_2$, the flip-flops in the elements 61 and 62 receive and store the new sum and carry information.

By the time $t_3$, the flip flops in the elements 61 and 62 are storing the new sum and carry information which is coupled to the outputs of those elements as units of current conducted through output terminals.

While the sum and carry are being stored between times $t_2$ and $t_3$, two new information bits are being stored in the elements 63 and 64 for summation with the carry bit just generated. This summation will occur at the next subsequent transfer time.

At the time $t_3$ when the elements 61, 62, 63, and 64 all are storing new information, there are new potential levels established on the output busses 67 and 68 and on the sum and carry busses 69 and 72. These new potential levels determine the output and the sum and carry to be stored at the next subsequent transfer time.

The sum and carry bits to be stored in the sum and carry elements 61 and 62 are generated in accordance with the logic of binary arithmetic. Table I is a truth table for such logic.

TABLE I

| INPUTS | | | OUTPUTS | |
|---|---|---|---|---|
| $A$ | $B$ | $C_i$ | $C_{i+1}$ | $S$ |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

In TABLE I the variables $A$ and $B$ are input bits stored in the elements 63 and 64 before the transfer operation is initiated. Variable $C_i$ is the carry bit stored in element 62 from the last previous summation. The variable $C_{i+1}$ is the carry bit and the variable $S$ is the sum bit generated as a result of the summation of variables $A$, $B$, and $C_i$.

Analysis of TABLE I shows that the following two equations may be used to represent threshold logic functions for the summation operation:

$$S = \sum_{n=1}^{n=3} X_n + 2\,\overline{C}_{i+1} \qquad (1)$$

when
$\Sigma > 2$ S=1
$\Sigma \leq 2$ S=0

$$S = \sum_{n=1}^{n=3} \overline{X}_n + 2\,C_{i+1} \qquad (2)$$

when
$\Sigma > 2$ S=0
$\Sigma \leq 2$ S=1

Equation (1) is implemented by the circuit shown in FIG. 5. A similar circuit can be shown for equation (2), but such circuit is omitted from this disclosure in the interest of keeping the description concise.

In the equation (1) the variable $X_n$ represents the $n$th input variable of a group of variables $X_1 = A$, $X_2 = B$, and $X_3 = C_i$. $X_n$ may have a value of 1 or 0. Thus, the sum $$\sum_{n=1}^{n=3} X_n$$

may vary from zero to three units for any specific summation. The variable $\overline{C}_{i+1}$ is multiplied by 2 in the equation to indicate that two units of current are steered from the source 70 through the resistor 71, the sum bus 69 and steering circuit 66 when $\overline{C}_{i+1}$ is true.

In equation (2), the variables $\overline{X}_n$ and $C_{i+1}$ respectively are complements of the variables $X_n$ and $\overline{C}_{i+1}$ just mentioned.

The units of current conducted through the resistor 71 establish a sum bus potential which is compared with a first reference, or threshold, potential $V_{R1}$ applied to terminal 75. This first reference potential $V_{R1}$ establishes a threshold level so that the sum element 61 is set to 1 only when three or more units of current are conducted through the resistor 71 and the sum bus 69. Otherwise element 61 is set to 0.

Further analysis of TABLE I shows that the following two equations may be used to represent threshold logic functions for the carry generation.

$$C_{i+1} = \sum_{n=1}^{n=3} \overline{X}_n \qquad (3)$$

when
$\Sigma > 2$ $C_{i+1} = 1$
$\Sigma \geq 2$ $C_{i+1} = 0$ $$C_{i+1} = \sum_{n=1}^{n=3} X_n \qquad (4)$$

when
$\Sigma > 2$ $C_{i+1} = 0$
$\Sigma \geq 2$ $C_{i+1} = 1$

Equation (3) also is implemented in the circuit of FIG. 5. A similar circuit can be shown for equation (4) but such circuit is omitted to clarify the description.

In equations (3) and (4), the variables represent the same input variables as in equation (2). The sum $$\sum_{n=1}^{n=3} \overline{X}_n$$

may vary from zero to three units.

The units of current, conducted through a resistor 74 and the carry bus 72, establish a carry bus potential level which is compared with a second reference potential $V_{R2}$, applied to the 0 input terminal 76 of the carry element 62 and to an input terminal 77 of the steering circuit 66. This second reference potential establishes a threshold level so that the carry element 62 is set to 1 and so that the steering circuit 66 cuts off two units of current to the sum bus 69 only when one or no units of current are conducted through the resistor 74 and the carry bus 72. Otherwise the element 62 is set to 0, and the circuit 66 steers two units of current through the carry bus 72.

Complete analysis of the TABLE I with respect to the operation of the adder 60 of FIG. 5 will show that the circuit of FIG. 5 sums the input bits A, B, and the carry bit $C_i$ in one cycle of the signals shown in FIG. 2. The sum bit is stored in the element 61 of FIG. 5 at the end of the cycle and is applied to the busses 67 and 68 for additional processing upon commencement of the next subsequent cycle of the control signals 25 and 26.

TWO'S COMPLEMENT-CIRCUIT

In the sign-magnitude binary representation of a decimal number, N bits are aligned sequentially with the least significant bit first. Those N bits are divided into two components including a magnitude component encompassing the first N-1 bits of the sequence and a sign component encompassing the last bit of the sequences. If the sign bit is a 1, the binary number is a negative number; and if the sign bit is a 0, the binary number is a positive number.

In converting any sign-magnitude binary number into its equivalent two's-complement form, the following two rules apply: (1) All positive binary numbers have a two's-complement number that is identical to the positive binary number. (2) All negative binary numbers have a two's-complement representation that is derived by complementing all of the bits of the sign-magnitude representatiton of the negative number and adding a 1 to the resulting binary number.

Figure 6:
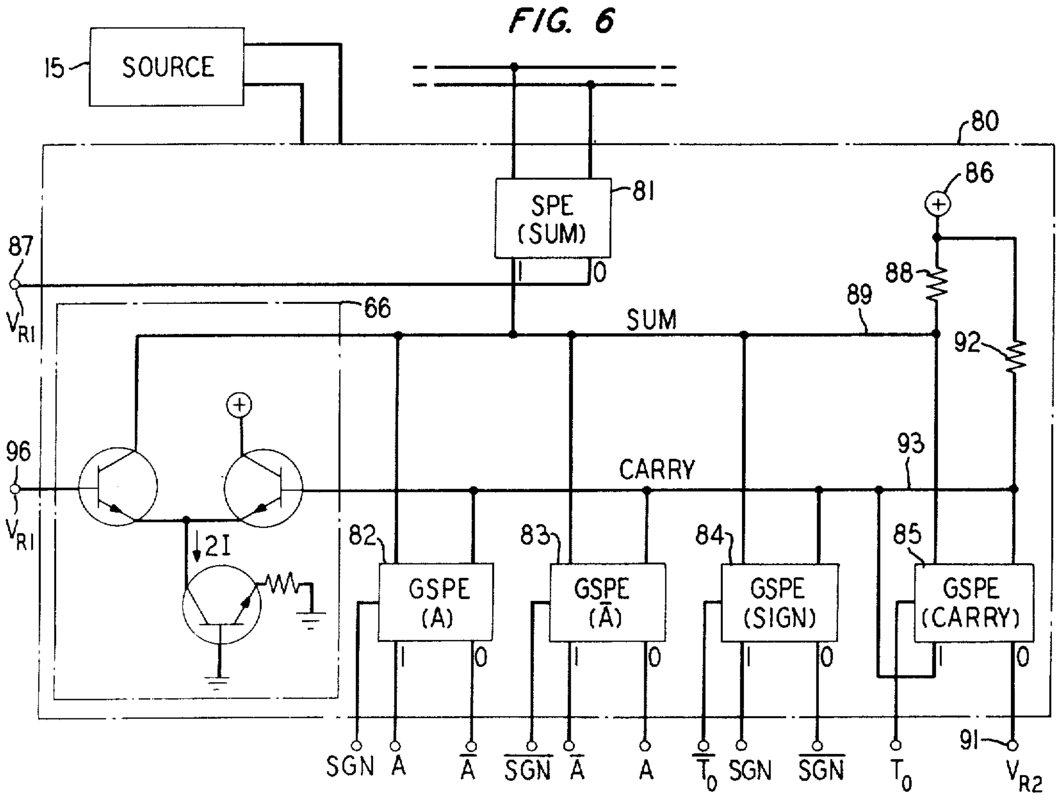
FIG. 6 shows a block diagram of a threshold logic two's-complement circuit including a group of storage-processor elements.

A threshold logic circuit has been devised for automatically converting sign-magnitude binary numbers into their two's-complement form. In FIG. 6 there is shown a block diagram comprising five storage-processor elements arranged as a threshold logic two's-complement circuit 80. A storage-processor element 81 receives and stores each bit of the two's-complement form of a binary word. Each bit A of the binary word initially is applied to and stored in a gated storage-processor element 82. Concurrently, a complement $\overline{A}$ is stored in another gated storage-processor element 83. Additional gated storage-processor elements 84 and 85 respectively receive and store a sign bit SGN and a carry bit $C_{i+1}$ generated by an addition.

It is noted that the configuration of the circuit 80 is similar to the configuration of the adder circuit of FIG. 5 except that there are five instead of four storage-processor elements and that the four elements 82, 83, 84, and 85 are gated storage-processor elements. These four elements are gated so that each is operative only part of the time.

The elements 82, 83, 84, and 85 have their 1 and 0 outputs respectively connected to a sum bus 89 and a carry bus 93. The 1 input of the carry element 85 is connected to the carry bus 93, and the 1 input of the sum element 81 is connected to the sum bus 89.

Reference potentials applied to the 0 inputs of the element 81 and 85 and to an input of the steering circuit 66 establish threshold levels necessary for achieving the desired logic function.

For instance, a first reference potential $V_{R1}$ applied to the 0 input terminal 87 of the element 81 establishes a threshold so that the sum element 81 is set to a 1 only at times when less than two units of current are conducted from a source 86 through a resistor 88 and the sum bus 89 to the storage-processor elements 82, 83, 84, and 85 and the steering circuit 66. The element 81 therefore is reset to 0 whenever at least two units of current are conducted through the sum bus 89.

In addition, a second reference potential $V_{R2}$ applied to the 0 input terminal 91 of the element 85 establishes a threshold so that a 1 is stored in the carry element 85 only when no unit of current is conducted from the source 86 through a resistor 92 and the carry bus 93 to the storage-processor elements 82, 83, 84, and 85.

The first reference potential $V_{R1}$ is also applied to an input terminal 96 of the steering circuit 66 for establishing a threshold so that steering circuit 66 supplies two units of current to the sum bus 89 only when at least two units of current are conducted through the carry bus 93.

An operating cycle of the two's-complement circuit 80 includes an interval sufficiently long so that all bits of a sequential binary number word can be converted into an equivalent two's-complement number word.

During any operating cycle each of the elements 82, 83, 84, and 85 is inoperative for producing output signals whenever a high signal is applied to its gate input. Thus, element 82 is disabled for an entire operating cycle whenever the sign bit SGN of the binary number is a 1. The element 83 is enabled and disabled alternatively with respect to the element 82 because the element 83 is controlled by the sign bit complement $\overline{SGN}$. The carry element 85 is disabled by a pulse $T_0$ which has a positive potential only for the duration that the first, or least significant, bit of the binary number is being processed through the elements 82 and 83. The element 85 is enabled at all times of the operating cycle other than the duration of the positive potential of the pulse $T_0$. The sign storage element 84 is enabled and disabled alternatively with respect to the carry element 85 because the complement $\overline{T}_0$ of the pulse $T_0$ is applied to the gate terminal of the element 84.

Element 84 causes a 1 to be added to the least significant bit of a word whenever the sign bit SGN is negative, i.e., a 1.

During any operating cycle and because of the applied gating signals, only two of the four elements 82, 83, 84, and 85 can be enabled concurrently. Thus, element 84 and either element 82 or element 83 are enabled for processing the least significant input bit; and the carry element 85 and either the element 82 or the element 83 are enabled for processing all subsequent bits of the received binary number.

Circuit 80 converts sign-magnitude binary numbers, received at the 1 input of the element 82, into equivalent two's-complement numbers in accordance with the previously stated rules for such a conversion.

For example, a positive binary number shifts into and through the circuit 80 without changing the value of any of its bits. A positive sign bit SGN, which is a 0, is applied continuously to the gate of element 82 during the operating cycle; and the bit $\overline{SGN}$, which is a 1, is applied continuously to the gate of element 83 during the operating cycle for processing any positive binary number word. Thus, element 82 is enabled continuously and the element 83 is disabled continuously during such cycle.

While processing the initial bit of the positive binary number, the least significant bit, i.e., a 1 or a 0, initially is stored in element 82 depending upon the value of the initial bit of the variable A. At the same time, the element 84 stores a 0 representing the positive sign bit SGN. The output of the carry element 85 is disabled during the processing of the initial bit.

During the storage portion of the bit processing cycle between the times $t_1$ and $t_2$ in FIG. 2, the contents of the elements 82 and 84 are coupled to the busses 89 and 93. The contents of the elements 83 and 85 are prevented from being coupled to the busses 89 and 93 because gate signals $\overline{SGN}$ and $T_0$ disable the output steering circuits of those elements.

Thus, units of current are steered through the busses 89 and 93 by the elements 82 and 84. The unit of current from element 82 is steered to either one of the two busses depending upon whether a 1 or a 0 is stored in element 82 in representation of the variable A. The unit of current from element 84 is steered to the carry bus 93 because a 0 necessarily is stored in element 84 in representation of the sign bit SGN.

If the initial bit of the variable A stored in element 82 is a 1, the sum element 81 will store a 1 and the carry element 85 will store a 0 when the information on the busses 89 and 93 is transferred into the elements 81 and 85 at time $t_3$. The sum stored is a 1 because one unit of current is steered to the sum bus 89 by the element 82 and no unit of current is steered to the same bus by the steering circuit 66. As previously stated, the sum element 81 stores a 1 only when less than two units of current are conducted through the sum bus 89.

Steering circuit 66 does not supply two units of current to the sum bus and the carry element 85 stores a 0 because one unit of current is conducted through the carry bus 93 in response to the 0 stored in the element 84.

If the initial bit stored in element 82 is a 0, the sum element 81 and the carry element 85 each will store a 0 when the information is transferred because two units of current are conducted through both the sum bus 89 and the carry bus 93.

Thus the initial bit of a positive binary number is applied to and stored in the sum element 81 with the same value as the corresponding bit of the received positive binary number.

Additional bits of the positive binary number word will not be analyzed as they affect the operation of the circuit 80, however, the output of the sign storage element 84 is disabled for all bits of such word following the initial bit.

The output of the carry element 85 is enabled for all bits subsequent to the initial bit of the positive binary word but no carries can occur during the processing of any positive binary word.

In circuit 80 negative binary words are complemented and a 1 is added to the resulting complemented binary word in accordance with the rule for converting binary words to equivalent two's-complement words. The negative sign bit SGN, which is a 1, is applied continuously to the gate of element 82, and the sign bit complement $\overline{SGN}$ is applied continuously to the gate of element 83 during the processing of any negative binary word. Thus, elements 82 and 83, respectively, are disabled and enabled during the processing of the negative binary word.

First of all, the initial bit of the variable $\bar{A}$ is stored in element 83 and a 1 is stored in sign storage element 84 because the sign bit SGN is a 1. At the same time, the output of the carry element 85 is disabled.

If element 83 stores a 1 representing a received bit 0, a 0 will be stored in the sum element 81 when the information on the bus 89 is transferred to the element 81 because two units of current are conducted by the sum bus 89. Thus, the initial received bit is complemented to a 1 and another 1 is added thereto, making the sum equal 0. Concurrently, a 1 is stored in the carry element 85 because no units of current are conducted through the carry bus 93 to the enabled elements 83 and 84.

If the element 83 stores a 0 representing a received 1, a 1 will be stored in the sum element 81 when the information on the bus 89 is transferred to the element 81. Thus, the initial received bit is complemented to a 0 and a 1 is added thereto, making the sum equal 1. Concurrently, a 0 is stored in the carry element 85 because one unit of current is steered through the carry bus 93 by the element 83.

Additional bits of the negative binary word are processed by the circuit 80 while the output of the element 84 is disabled and the output of the carry element 85 is enabled. Carriers generated and stored in the carry element 85 are added to subsequently received complement bits $\bar{A}$ in sequential order. The entire circuit 80 continues to operate as a one-bit adder that processes the remaining bits of the negative binary number in the operating cycle for a word.

Thus, the bits of a received negative binary number are complemented and a 1 is added to the resulting complemented number yielding the two's-complement of the received negative binary number.

Operation of the threshold logic two's-complement circuit 80 has been described for both positive and negative binary numbers. In the description of the operation it is clear that the logic functions for converting binary numbers to equivalent two's-complement numbers are achieved by properly establishing the thresholds through means of reference potentials applied to the storage-processor elements 81 and 85 and to the steering circuit 66.

Figure 7:
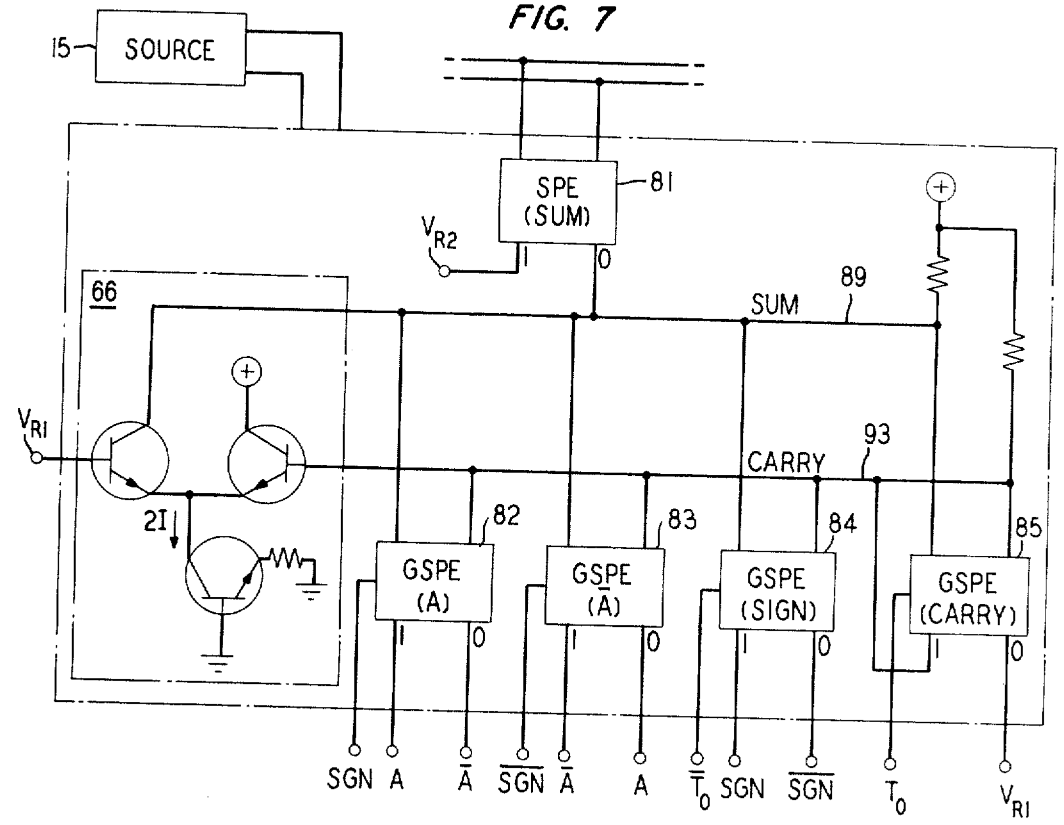
FIGS. 7, 8 and 9 show block diagrams of alternative threshold logic two's-complement circuits.

Referring now to FIG. 7, there is shown an alternative arrangement of the two's-complement circuit. The elements 82, 83, 84, and 85 have their 1 and 0 outputs respectively connected to the sum bus 89 and the carry bus 93. The 1 input of the carry element 85 is connected to the carry bus 93, and the 0 input of the sum element 81 is connected to the sum bus 89.

In the arrangement of FIG. 7, a first reference potential $V_{R1}$, applied to the carry element 85, is selected so that a 1 is stored in the carry element 85 only when no unit of current is conducted through the carry bus 93. The first reference potential $V_{R1}$ is applied to the steering circuit 66 so that it steers two units of current to the sum bus 89 only when at least one unit of current is conducted through the carry bus. A second reference potential $V_{R2}$, applied to the sum element, is selected so that a 1 is stored in the sum element only when at least three units of current are conducted through the sum bus 89.

The arrangement of FIG. 7, which is responsive to a different combination of threshold potentials than the circuit of FIG. 6, nevertheless produces the two's-complement output function of the circuit of FIG. 6.

Figure 8:
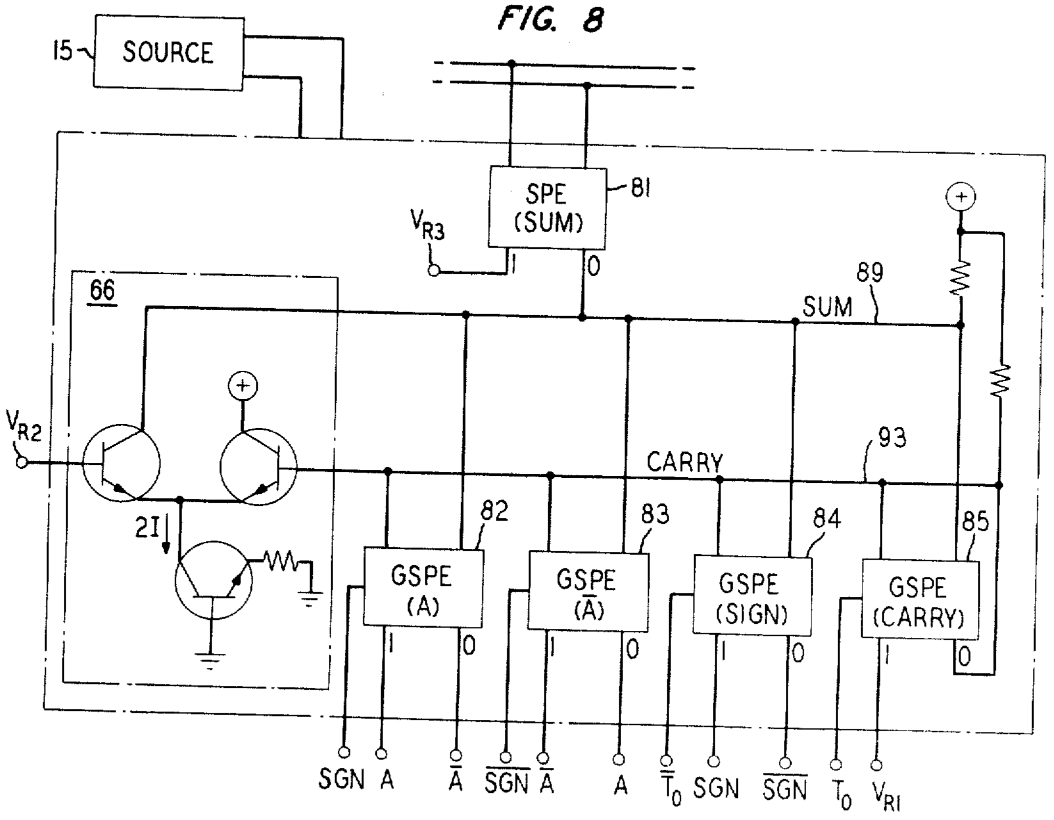

Referring now to FIG. 8, there is shown another arrangement of a two's-complement circuit. The elements 82, 83, 84, and 85 have their 1 and 0 outputs respectively connected to the carry and sum busses. The 0 input of the carry element 85 is connected to the carry bus 93, and the 0 input of the sum element 81 is connected to the sum bus 89.

In the arrangement of FIG. 8, a first reference potential $V_{R1}$, applied to the carry element 85, is selected so that a 1 is stored in the carry element 85 only when at least two units of current are conducted through the carry bus 93. A second reference potential $V_{R2}$, applied to the steering circuit 66, is selected so that two units of current are steered to the sum bus 89 only when at least one unit of current is conducted through the carry bus 93. A third reference potential $V_{R3}$, applied to the sum element 81, is selected so that a 1 is stored in the sum element only when at least three units of current are conducted through the sum bus 89.

The arrangement of FIG. 8 also produces the two's-complement output function.

Figure 9:
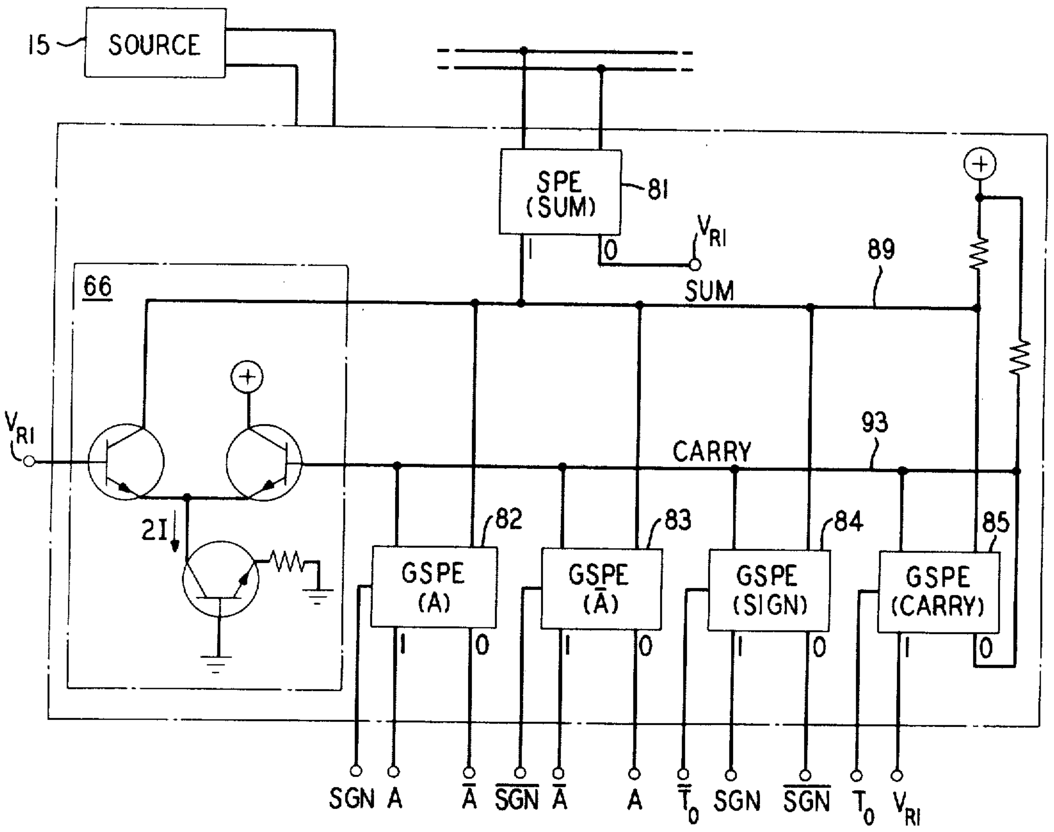

Referring now to FIG. 9, there is shown another embodiment of the two's-complement circuit. The elements 82, 83, 84, and 85 have their 1 and 0 outputs respectively connected to the carry and sum busses. The 0 input of the carry element 85 is connected to the carry bus 93, and the 1 input of the sum element 81 is connected to the sum bus 89.

In the arrangement of FIG. 9, a reference potential $V_{R1}$ is selected so that a 1 is stored in the carry element 85 and the steering circuit 66 steers two units of current to the sum bus 89 only when at least two units of current are conducted through the carry bus 93. The reference potential $V_{R1}$ also is applied to the sum element 81 so that the sum element stores a 1 only when less than two units of current are conducted through the sum bus 89.

The arrangement of FIG. 9 also produces the two's-complement output function.

The above-detailed description is illustrative of several embodiments of the invention. The embodiments described herein together with additional embodiments obvious to those skilled in the art are considered to be within the scope of this invention.

What is claimed is:

1. A storage-processor element comprising a flip-flop circuit having first and second input terminals and first and second output terminals, first and second input circuit means respectively for coupling double-rail input signals to the first and second input terminals, the flip-flop circuit being constrained to one of two stable states in response to the input signals and indicating the assumed state at the first and second output terminals, first and second charge storage devices retaining previously determined charge conditions independent of the state to which the flip-flop circuit is being constrained by the input signals, first and second asymmetrically conducting devices respectively coupling signals representing the assumed state of the flip-flop from the first and second output terminals to the first and second charge storage means for storing the assumed state of the flip-flop circuit as quantities of charge, first and second busses, and means for converting the charge stored in the first and second charge storage means into a predetermined magnitude of current that is steered to one or the other of the busses.

2. A storage-processor element in accordance with claim 1 further comprising means connecting with the converting means for disabling the converting means from steering current to either of the busses.

3. A storage-processor element in accordance with claim 1 wherein the flip-flop circuit comprises a pair of transistors cross-coupled for alternative conduction, the first and second input circuit means each separately couples a different input signal to a different input of the flip-flop circuit, the first and second charge storage means include parasitic base-collector capacitance of a pair of emitter-follower connected transistors, and the converting means include an emitter-coupled pair of transistors.

4. A storage-processor element in accordance with claim 3 wherein the first and second input circuits each comprise a common-collector connected transistor of an opposite conductivity type than the transistors of the flip-flop, the common-collector transistors having emitter electrodes connected respectively to the first and second input terminals.

5. A storage-processor element in accordance with claim 3 further comprising means connecting with the emitters of the emitter-coupled pair of transistors for disabling the current steering means.

6. A storage-processor element comprising a bistable circuit for producing at first and second output terminals signals representing the state of the circuit, means for coupling input signals to the circuit, first and second charge storage devices, first and second switching devices for coupling respectively the first and second output terminals to the first and second charge storage devices to store therein the state of the circuit as quantities of charge, means for steering a predetermined magnitude of current alternatively to one or another of first and second storage-processor element output terminals in response to the charge stored in the first and second charge storage devices, and means for biasing the first and second switching devices to cutoff for retaining the charge on the first and second charge storage devices for a predetermined duration after the state of the bistable circuit is terminated.

7. An element in accordance with claim 6 wherein the bistable circuit comprises a pair of transistors cross-coupled for alternative conduction, the coupling means include separate paths for coupling complementary signals to different terminals of the bistable circuit.

8. A storage-processor element in accordance with claim 6 further comprising means connecting with the current steering means for disabling the current steering means.

9. An element in accordance with claim 7 wherein the first and second charge storage devices comprise parasitic capacitances of a pair of emitter-follower connected transistors, and the steering means include an emitter-coupled pair of transistors each having a base electrode connected with a different emitter of the emitter-follower connected transistors and each having a collector electrode connected with a different one of the element output terminals.

10. A storage-processor element in accordance with claim 9 further comprising means connecting with the emitters of the emitter-coupled pair of transistors for disabling the current steering means.

* * * * *